United States Patent Office 3,490,894
Patented Jan. 20, 1970

3,490,894
METHOD FOR CONTROLLING UNWANTED VEGETATION
Everett E. Gilbert, Morris Township, Morris County, N.J., assignor to Allied Chemical Corporation, New York, N.Y., a corporation of New York
No Drawing. Original application Aug. 11, 1965, Ser. No. 478,984, now Patent No. 3,396,227, dated Aug. 6, 1968. Divided and this application May 20, 1968, Ser. No. 730,642
Int. Cl. A01n 9/24
U.S. Cl. 71—122                                9 Claims

ABSTRACT OF THE DISCLOSURE

Pesticidal compositions and method for killing weeds with dihydric fluoroalcohols and their alkali metal and ammonium salts.

---

This application is a division of my application Ser. No. 478,984 filed Aug. 11, 1965, now U.S. Patent No. 3,396,227.

This invention relates to pesticidal compositions and to a method for controlling various biological pests, including insects, mites, nematodes and unwanted vegetation by the application to the pests or their hosts of certain dihydric fluoroalcohols prepared by the reaction of perhaloacetones with alpha olefins at a 2:1 molar ratio.

I have found the resulting compounds and certain of their mono- and dialkali metal and mono- and diammonium salts are active pre- and post-emergence herbicides, as well as insecticides, miticides and nematocides.

Compounds suitable for use as pesticides according to my invention are the dihydric fluoroalcohols shown below and the mono- and dialkali metal and mono- and diammonium salts of those compounds wherein all the X groups are fluorine.

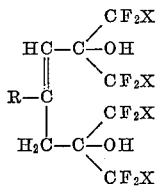

In the above formula R is a member selected from the group consisting of phenyl and lower alkyl groups of 1 to 3 carbon atoms, and X is a member selected from the group consisting of fluorine and chlorine.

The fluoroalcohols used in my invention can be prepared by reacting two moles of perhaloacetone with one mole of an alpha alkene such as isobutylene and alpha methyl styrene, as described in copending application, Ser. No. 157,270, of Morton H. Litt and George J. Schmitt, filed Dec. 5, 1961, now U.S. Patent No. 3,324,187 and shown in the equation below.

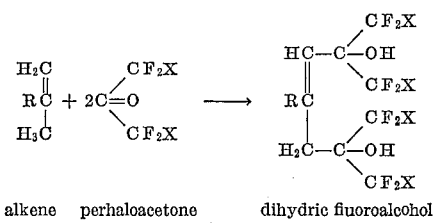

alkene     perhaloacetone          dihydric fluoroalcohol

When R in the alkene shown above is a lower alkyl radical, I have found that minor proportions of the structural isomers shown below are formed in amounts ranging from about 25% to 35% of the total yield in which the double bond has moved from the primary chain to the R side chain.

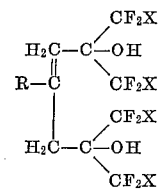

When reference is made herein to the 1,3-bis(1,3-hexahalo-2-hydroxy-2-propyl)-2-alkyl-1-propenes, the term is intended to include mixtures of the stated compound with minor proportions of its double bond-variant isomer as described.

The resulting dihydric fluoroalcohols are solids only slightly soluble in water.

The monoalkali metal and ammonium salts of the above fluoroalcohols, of which the alkali metal salts are water-soluble solids, the ammonium salt is water insoluble, can be prepared from those of the above alcohols in which all the X members are fluorine, by simply mixing the alcohols with an aqueous alkali metal hydroxide or anhydrous ammonia.

The dialkali metal and diammonium salts can also be prepared, but require the use of large excesses of alkali and long reaction times.

Among the compounds useful as pesticides according to my invention are the following I. 1,3-bis(1,3-dichlorotetrafluoro-2-hydroxy-2-propyl)-2-phenyl-1-propene

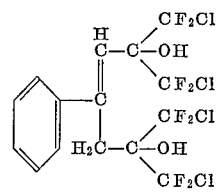

II. 1,3-bis(hexafluoro-2-hydroxy-2-propyl)-2-phenyl-1-propene

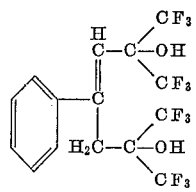

III. 1-3-bis(hexafluoro-2-hydroxy-2-propyl)-2-phenyl-1-propene-monosodium salt

IV. 1,3-bis(hexafluoro-2-hydroxy-2-propyl)-2-methyl-1-propene and minor amounts of 1,3-bis(hexafluoro - 2 - hydroxy-2-propyl)-2-methylene propane

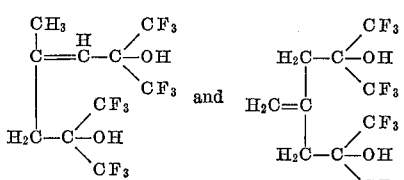

V. 1,3-bis(hexafluoro-2-hydroxy-2-propyl)-2-methyl-1-propene monosodium salt

VI. 1,3-bis(1,3-dichlorotetrafluoro - 2 - hydroxy-2-propyl)-2-methyl-1-propene with minor amounts of 1,3-(1,3-dichlorotetrafluoro-2-hydroxy-2-propyl)-2-methylene propane

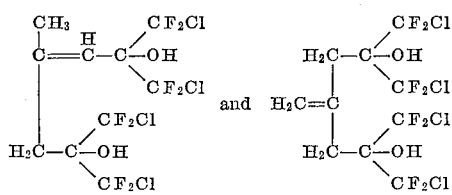

VII. Disodium salt of 1,3-bis(hexafluoro-2-hydroxy-2-propyl)-2-methyl-1-propene

The compounds described herein have strong biocidal activity in a number of important fields to combat or control such pests by contacting such pests either directly or by application of the compounds to the environment or habitat or host of the pest. They can be employed as herbicides in combating unwanted vegetation in either pre-emergence or post-emergence application to soils and/or plants.

In the insecticidal field, control of many noxious pests can be effected by contacting the pests or their environment, their food or the host, such as insect infested plants, soils, etc., with the dihydric fluoroalcohol compounds and salts of the perfluoro compounds. Among the insects which can be controlled by the process of my invention are Mexican bean beetles (Epilachna varivestis), southern armyworms (Prodenia eridania), pea aphids (Macrosiphum pisi), two-spotted spider mites (Tetranychus telarius), house flies (Musca domestica) and many others, which are affected thereby in either adult, nymph, larval or egg form. Nematode control can also be effected by the process of my invention.

When reference is made herein to contacting biological pests with the compound of the invention, it is to be understood to include not only direct contacting, but also such contact achieved through treatment of the environment, habitat, food or host of such pests.

Application of the toxicant can be made in conventional manner, in admixture with a carrier. Usually the toxic compounds are mixed with at least one diluent, either solid or liquid, and are applied to the pest or its host, for example, as a finely divided dust, coarse granules or pellets, solvent solutions or aqueous sprays. The alcohols of my invention and the ammonium salts which are relatively insoluble in water can be prepared in the form of aqueous dispersions by dissolving the alcohol in a solvent such as xylene and dispersing the solution in water with the aid of anionic, cationic, or non-ionic wetting, dispersing, or emulsifying agents. In the case of the highly water-soluble alkali metal salts of the alcohols from hexafluoroacetone, these compounds can be dissolved in water alone and applied as water solutions, as well as being applied in dispersions if desired. Concentrations of toxicant will depend on the sensitivity of the pest organisms to be controlled. Usually concentrations between about .03% and about 3.0% are sufficient.

Dusts, granules, pellets and wettable powders can also be used in applying the dihydric fluoroalcohol compounds or their salts according to my invention. For the preparation of dusts the alcohol or the appropriate salt thereof may be mixed in finely divided solid form with suitable powders including finely divided dry solid talc, clays such as attapulgite, kaolin, or fuller's earth, wood flour, or other inert solid carriers of the type commonly employed in formulating pesticidal powder compositions. These powders may be granulated or pelleted; or solutions or the dihydric fluoroalcohol carbonates may be impregnated into granular or pelleted carriers of mineral and vegetable origin. Wettable powder formulations, suitable for dispersing in water and applying the water dispersion to the soil, plants or insects, etc., are prepared by incorporating in any of the finely divided powders, small amounts of surface active materials, for example, about 1% to about 5% by weight, which serve to maintain the finely powdered composition dispersed in water with which it is mixed.

Suitable surface active materials adapted for use in making both liquid and solid dispersions are anionic, cationic, or non-ionic wetting dispersing and emulsifying agents commonly employed in the formulation of wettable powder compositions, for example, as listed by J. W. McCutcheon in "Soap and Chemical Specialties," December 1957 and January, February, March and April 1958. These include the alkali metal and ammonium salts of long chain aliphatic carboxylic acids, sulfonates of the aromatic or long chain aliphatic hydrocarbons, such as sodium alkyl sulfates and sulfonates, alkyl aryl sulfonate salts, sulfonates of glycerides and their fatty acids and sulfonates of derivatives of fatty acid esters.

EXAMPLE 1

Preparation of monosodium salt of 1,3-bis(hexafluoro-2-hydroxy-2-propyl)-2-methyl-1-propene (A) Eighty grams (0.206 mole) of 1,3-bis(hexafluoro-2-hydroxy-2-propyl)-2-methyl-1-propene prepared by reaction of isobutylene and hexafluoroacetone at 1:2 molar ratio was mixed with 42 ml. (0.21 mole) of 5 N aqueous sodium hydroxide and the mixture was heated at the boiling point for 15 minutes producing a clear solution. The reaction mixture was vacuum dried for 5 days resulting in a white, free-flowing powder melting at 55–58° C. The yield was 90 grams which corresponds to a 100% theoretical yield for the monohydrated, monosodium salt.

Analytical data are shown below in comparison to calculated data for the mono and disodium salts with 1 and 2 molecules of water of hydration.

| Calculated | C | H | Na |
| --- | --- | --- | --- |
| Mono Na Salt: | | | |
| Anyhdrous | 29.2 | 1.7 | 5.5 |
| 1 H$_2$O | 28.0 | 2.1 | 5.4 |
| 2 H$_2$O | 26.8 | 2.5 | 5.2 |
| Di Na Salt: | | | |
| Anhydrous | 27.7 | 1.4 | 10.6 |
| 2 H$_2$O | 25.6 | 2.1 | 9.8 |
| Found | 27.8 | 2.4 | 5.1 |

(B) Example 1–A was repeated except that an excess of sodium hydroxide was used, i.e., 20 ml. of 1 N aqueous NaOH equivalent to 0.020 mole, with 2.0 grams, 0.00515 mole of the isobutylene hexafluoroacetone reaction product. The reactants were refluxed for 1 hour and were then allowed to cool to room temperature, i.e., about 25° C., extracted with 50 ml. ethyl ether, and evaporated to dryness. The solid was recrystallized once from benzene and dried for 24 hours at 60° C. in vacuo. They melted at 226–230° C. Elemental analysis showed. Found: C, 29.0; H, 2.5; Na, 5.7.

(C) A third sodium salt was prepared by refluxing the reaction product of isobutylene and hexafluoroacetone of Example 1–A with an excess of 4 N aqueous sodium hydroxide for 24 hours, cooling, and separating the resulting crystals and drying the crystals to constant weight in vacuo, at 115° C. The resulting compound melted at 230°–235° C. and had the following elemental analysis. Found: C, 29.3; H, 2.3; Na, 6.0.

EXAMPLE 2

Preparation of disodium salt

The 1:2 molar adduct of isobutylene and hexafluoroacetone was heated to boiling with a tenfold molar excess of 10 N aqueous NaOH and was then cooled to crystallization. The resulting crystals were separated by filtration and recrystallized twice from toluene. A second sample was similarly prepared except that refluxing and stirring was continued overnight.

Both samples melted over the range 103–200° C. Both samples were analyzed for carbon, hydrogen, sodium and water with the results shown below indicating the product to be the disodium dihydrate.

Found: C, 25.64; H, 2.34; Na, 8.3.

EXAMPLE 3

Preparation of sodium salt of 1,3-bis(hexafluoro-2-hydroxy-2-propyl)-2-phenyl-1-propene Twenty-seven grams (0.06 mole) of 1,3-bis(hexafluoro-2-hydroxy-2-propyl)-2-phenyl-1-propene produced by reaction of α-methyl styrene and hexafluoroacetone in 1:2 molar ratio, were mixed with 2.6 grams (0.065 mole) of 5 N aqueous sodium hydroxide in 10 ml. of water. The mixture was warmed for 20 minutes on a hot plate. The resulting solution was dried 5 days in vacuo and yielded 29 grams of the monosodium salt as a dry white powder corresponding to a 100% theoretical yield of mono-hydrated monosodium salt, which was completely water-soluble.

equivalent to 16, 8 or 4 pounds per acre, and held for a 10- to 12-day observation period, after which they were rated.

In both the pre-emergence and post-emergence tests, similarly seeded but untreated flats were held for comparison. The response of the test plant to the toxicant was measured by "injury rating" (IR) on a scale of 0 to 10; 0 indicating no injury, 10 indicating complete kill of the test plants. "Percent mortality" (PK), a calculated index, is obtained by comparing the mortality in the toxicant treated flats with that in the untreated flats. Results of both pre-emergence and post-emergence tests are shown in Table II.

TABLE II

| | | Pre-emergence | | | | | | | | | | | |
|---|---|---|---|---|---|---|---|---|---|---|---|---|---|
| | Lbs. | Corn | | Cotton | | Wheat | | Soybeans | | Rye Grass | | Rape | |
| Compound No. | per Acre | IR [1] | PK [2] | IR | PK | IR | PK | IR | PK | IR | PK | IR | PK |
| I | 4 | | | | | | | | | | | | |
| I | 8 | | | | | | | | | | | | |
| I | 16 | | | | | | | | | | | | |
| II | 16 | 0 | 0 | 0 | 0 | 0 | 0 | 2 | 18 | 6 | 60 | 10 | 100 |
| III | 16 | 1 | 5 | 2 | 9 | 1 | 0 | 0 | 0 | 4 | 40 | 10 | 100 |
| IV | 16 | 0 | 0 | 0 | 0 | 1 | 0 | 1 | 0 | 6 | 60 | 10 | 100 |
| V | 16 | 0 | 0 | 3 | 18 | 5 | 50 | 1 | 0 | 7 | 70 | 10 | 100 |
| VI | 16 | 1 | 10 | 1 | 3 | 1 | 1 | 0 | 0 | 3 | 30 | 10 | 100 |
| VII | 16 | 0 | 0 | 6 | 50 | 5 | 37 | 5 | 25 | 8 | 80 | 9 | 90 |

| | Post-emergence (IR [1]) | | | | | | | | |
|---|---|---|---|---|---|---|---|---|---|
| | Crops | | | | | Weeds | | | Crops and Weeds |
| Compound No. | Corn | Cotton | Wheat | Soybeans | Av. | Rye Grass | Rape | Av. | Average |
| I | 1 | 10 | 9 | 9 | 7 | 8 | 9 | 9 | 8 |
| I | 1 | 10 | 10 | 10 | 8 | 10 | 10 | 10 | 9 |
| I | 4 | 10 | 9 | 9 | 8 | 10 | 10 | 10 | 9 |
| II | 2 | 10 | 5 | 9 | 6 | 8.5 | 10 | 9 | 7 |
| III | 1 | 10 | 6 | 10 | 7 | 7 | 10 | 9 | 7 |
| IV | 2 | 10 | 4 | 9.5 | 6 | 10 | 10 | 10 | 8 |
| V | 3 | 9.5 | 9.5 | 5 | 7 | 10 | 10 | 10 | 8 |
| VI | 4 | 10 | 7 | 10 | 8 | 9 | 10 | 9 | 8 |
| VII | 2 | 5 | 4 | 5 | 4.5 | 3 | 9 | 6 | 5 |

[1] IR=Injury Rating; 0=No Injury, 10=Complete Kill.  [2] PK=Percent Kill.

EXAMPLE 4

The compounds listed in Table I were tested as pre-emergence and post-emergence herbicides in Standard Macroscreening greenhouse tests according to the method of Shaw and Swanson described in "Weeds," volume 1, No. 4, pages 352–365.

TABLE I

Compounds tested as weed killers (I) 1,3-bis(1,3-dichlorotetrafluoro-2-hydroxy-2-propyl)-2-phenyl-1-propene.
(II) 1,3-bis(hexafluoro-2-hydroxy-2-propyl)-2-phenyl-1-propene.
(III) Monosodium salt of 1,3-bis(hexafluoro-2-hydroxy-2-propyl)-2-phenyl-1-propene.
(IV) 1,3-bis(hexafluoro-2-hydroxy-2-propyl)-2-methyl-1-propene.
(V) Monosodium salt of 1,3-bis(hexafluoro-2-hydroxy-2-propyl)-2-methyl-1-propene.
(VI) 1,3-bis(1,3-dichlorotetrafluoro-2-hydroxy-2-propyl)-2-methyl-1-propene.
(VII) Disodium salt of 1,3-bis(hexafluoro-2-hydroxy-2-propyl)-2-methyl-1-propene.

In the pre-emergence tests, the toxicant, dispersed in a liquid such as acetone or water, was sprayed, within one day after seeding, onto seeded flats containing test crop seed species and test weed seed species, at a volume of spray equal to 80 gallons of spray per acre and at concentrations of toxicant per acre of 16, 8, or 4 pounds per acre. Immediately after spraying, the test flats were sub-irrigated and the needed moisture maintained during the following 16-day test period, during which the flats were held in the greenhouse for observation, and were then rated as described hereinafter. In the post-emergence tests, flats with crop and weed seedlings were treated 8 to 10 days after seeding with the indicated toxicant at a rate It will be noted from Table II that the compounds of the invention show excellent selective pre-emergence kill of broadleaf weeds, as exemplified by rape, with little or no crop injury. Post-emergence tests showed good to excellent nonselective contact activity, especially on broadleaf plants.

EXAMPLE 5

Four compounds were subjected to pre-emergence test against crabgrass and Johnson grass with the toxicant applied at the rate of 16 pounds per acre, using the method described in Example 4 above and observed for injury rating with results shown in Table III below. The compounds tested were Nos. II, IV, V and VII identified in Table I above.

TABLE III.—PRE-EMERGENCE TESTS ON GRASSES

| | Injury rating | |
|---|---|---|
| Compound No. | Crabgrass | Johnson Grass |
| II | 5 | 8 |
| IV | 9 | 10 |
| V | 7 | 9 |
| VII | 8.5 | |

The above tests indicate good to excellent control of crabgrass and Johnson grass by the indicated compounds.

EXAMPLE 6

The compounds listed below were tested for insecticidal activity against one or more of the pests, Mexican bean beetles, pea aphids, southern armyworms and two-spotted spider mites, by preparing suspensions in acetone of the compounds and adjusting them to concentrations of 2 pounds of toxicant per 100 gallons of suspension. Compound I below was also tested at concentrations of ¼ lb. per 100 gallons. The suspensions were then sprayed in the standard manner onto the leaves of the bean plants, 2 seconds on the upper surface and 5 seconds on the under surface. After spraying, the deposits were allowed to dry on the plants and the particular pests being tested were confined in cages on the treated leaves. Three days after treatment the plants were observed and mortality records taken in percent kill of the pest.

The compounds thus tested were:

(I) 1,3-bis(1,3-dichlorotetrafluoro-2-hydroxy-2-propyl)-2-phenyl-1-propene.
(II) 1,3-bis(hexafluoro-2-hydroxy-2-propyl)-2-phenyl-1-propene.
(III) Monosodium salt of 1,3-bis(hexafluoro-2-hydroxy-2-propyl)-2-phenyl-1-propene.
(IV) 1,3-bis(hexafluoro-2-hydroxy-2-propyl)-2-methyl-1-propene.
(V) Monosodium salt of 1,3-bis(hexafluoro-2-hydroxy-2-propyl)-2-methyl-1-propene.
(VI) 1,3-bis(1,3-dichlorotetrafluoro-2-hydroxy-2-propyl)-2-methyl-1-propene.

Results of the tests are shown in Table IV below.

TABLE IV

| Compound No. | Lbs. per 100 gals. | Percent Kill of— | | | |
|---|---|---|---|---|---|
| | | Bean beetle larvae | Pea aphid adults | Southern armyworm larvae | Two-spotted spider mite |
| I | 2 | 100 | 100 | 100 | 100 |
| I | .25 | 100 | 0 | 80 | 86 |
| II | 2 | | | 100 | 100 |
| III | 2 | 25 | 0 | 80 | 100 |
| IV | 2 | | | 100 | 100 |
| V | 2 | 40 | | 100 | 97 |
| VI | 2 | 100 | 100 | 100 | |

EXAMPLE 7

The compounds listed below were tested for nematocidal activity by formulating solutions of the toxicant as acetone solutions (4.8 grams/100 ml.) and diluting the solutions with water to 0.1% (1,000 parts per million) of toxicant. Into each of three small petri dishes were placed 5 ml. of the toxicant solution and approximately 100 nematode worms were placed in each solution. The dishes were held in a dark room at temperatures of 75° to 80° F. Observations of the worms after 1, 2 and 3 days were made to determine the percent mortality of the worms.

In the above test, compounds III, the monosodium salt of 1,3 - bis(hexafluoro - 2-hydroxy-2-propyl)-2-phenyl-1-propene; V, the monosodium salt of 1,3-bis(hexafluoro-2-hydroxy-2-propyl)-2-methyl-1-propene; IV, 1,3-bis(hexafluoro - 2 - hydroxy - 2 - propyl) - 2 - methyl - 1 - propene and VI, 1,3 - bis(1,3 - dichlorotetrafluoro-2-hydoxy-2-propyl)-2-methyl-1-propene gave results shown in Table V below.

TABLE V

| Compound No. | Percent Mortality | | |
|---|---|---|---|
| | 1 Day | 2 Days | 3 Days |
| III | 100 | | |
| IV | 60 | 93 | 100 |
| V | 99 | 100 | |
| VI | 100 | | |

EXAMPLE 8

The compound listed below were tested as toxicants against houseflies (*Musca domestica*) by preparing a bait mixture of powdered milk, granulated sugar and powdered egg and adding thereto solutions or suspensions of the toxicant in amounts of 0.5% or less of the bait. The bait is then allowed to dry and is repulverized. The treated food is then placed in emergence cages containing 50 fly pupae. Cages containing untreated food were used as checks. Examinations of each cage were made periodically to determine emergence, condition of flies and acute toxicity. Nine days after start of test, oviposition medium was placed in each cage, and on the following day the medium was examined for eggs, and if none were present, the medium was moistened and examined daily until oviposition ocurred or all adults were dead. Egg viability was determined by inspecting the medium for growing larvae 2 to 3 days after oviposition.

Results of these tests on compounds:

(I) 1,3-bis(1,3-dichlorotetrafluoro-2-hydroxy-2-propyl)-2-phenyl-1-propene;
(II) 1,3-bis(hexafluoro-2-hydroxy-2-propyl)-2-phenyl-1-propene;
(III) Monosodium salt of 1,3-bis(hexafluoro-2-hydroxy-2-propyl)-2-phenyl-1-propene;
(IV) 1,3-bis(hexafluoro-2-hydroxy-2-propyl)-2-methyl-1-propene;
(V) Monosodium salt of 1,3-bis(hexafluoro-2-hydroxy-2-propyl)-2-methyl-1-propene; and
(VI) 1,3 - bis(1,3 - dichlorotetrafluoro - 2-hydroxy - 2-propyl)-2-methyl-1-propene are shown in Table VI below.

TABLE VI

| Cpd. No. | Percent on Bait | No. Flies | Percent Kill | | | | Eggs Laid | Larvae Condition |
|---|---|---|---|---|---|---|---|---|
| | | | 7 Days | 8 Days | 9 Days | 10 Days | | |
| I | .125 | | 100 | | | | | |
| I | .0313 | | 84.8 | | | | | |
| II | .0625 | 45 | 100 | | | | | |
| II | .0313 | 44 | 54.6 | | 61.4 | | Few | None. |
| III | 1.0 | 48 | 97.9 | | | 100 | None | Do. |
| IV | .0625 | 48 | 100 | | | | | |
| IV | .0313 | 47 | 89.4 | | 95.8 | | None | |
| IV | .0156 | 44 | 0 | | 2.3 | | Yes | Normal. |
| V | .5 | 50 | 100 | | | | | |
| V | .25 | 43 | 100 | | | | | |
| V | .125 | 47 | 100 | | | | | |
| V | .0313 | 50 | | 98 | | 98 | None | |
| V | .0156 | 46 | | 37 | | 52.2 | Many | Do. |
| VI | 1.0 | 45 | 100 | | | | None | None. |
| Check none | | 43 | 0 | | 0 | | Yes | Normal. |

It will be seen from Table VI that the compounds of the invention are excellent toxicants against houseflies even at exceedingly low concentrations.

While the above describes the preferred embodiments of my invention, it will be understood that departures can be made therefrom within the scope of the specification and claims.

I claim:

1. The method for controlling unwanted vegetation which comprises contacting such vegetation with a toxic amount of a compound selected from the group consisting of (1) compounds of the formula

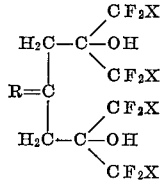

wherein R is a member selected from the group consisting of phenyl and lower alkyl groups of 1 to 3 carbon atoms, and X is a member selected from the group consisting of fluorine and chlorine (2) mono and dialkali metal and mono and diammonium salts of the compounds of the said formula wherein all the X substituents are fluorine.

2. The method of claim 1 wherein soil containing weed seeds is contacted with the toxic compound.

3. The method according to claim 1 wherein the toxic compound is 1,3-bis(1,3-dichlorotetrafluoro-2-hydroxy-2-propyl)-2-phenyl-1-propene.

4. The method according to claim 1 wherein the toxic compound is 1,3-bis(hexafluoro-2-hydroxy-2-propyl)-2-phenyl-1-propene.

5. The method according to claim 1 wherein the toxic compound is a sodium salt of 1,3-bis(hexafluoro-2-hydroxy-2-propyl)-2-phenyl-1-propene.

6. The method according to claim 1 wherein the toxic compound is 1,3-bis(hexafluoro-2-hydroxy-2-propyl-2-methyl-1-propene.

7. The method according to claim 1 wherein the toxic compound is a sodium salt of 1,3-bis(hexafluoro-2-hydroxy-2-propyl)-2-methyl-1-propene.

8. The method according to claim 1 wherein the toxic compound is 1,3-bis(1,3-dichlorotetrafluoro-2-hydroxy)-2-methyl-1-propene.

9. The method of claim 1 wherein growing weeds are contacted with the toxic compound.

References Cited

UNITED STATES PATENTS

| | | | |
|---|---|---|---|
| 3,320,047 | 5/1967 | Gilbert et al. | 71—122 |
| 3,324,187 | 6/1967 | Litt et al. | 260—633 |
| 3,393,993 | 7/1968 | Gilbert et al. | 71—122 |
| 3,396,227 | 8/1968 | Gilbert et al. | 71—122 |

FOREIGN PATENTS 10,074  5/1965  Japan.

JAMES O. THOMAS, JR., Primary Examiner

PO-1050
(5/69)

UNITED STATES PATENT OFFICE
CERTIFICATE OF CORRECTION

Patent No. 3,490,894      Dated January 20, 1970

Inventor(s) Everett E. Gilbert

It is certified that error appears in the above-identified patent and that said Letters Patent are hereby corrected as shown below:

Column 4, in the Table, fourth column, "5.5" should read -- 5.6 --.

Column 8, line 2, "compound" should read -- compounds --;

line 11, "fllies" should read -- flies --;

Claim 1, that portion of the formula reading $$\begin{array}{c} \text{"H}_2\text{C-"} \\ | \\ \text{R=C} \\ | \end{array} \quad \text{should read} \quad -- \begin{array}{c} \text{H}_2\text{C-} \\ \| \\ \text{R-C} \\ | \end{array} --$$

Column 9, line 16, -- ) -- should be inserted after "propyl"

SIGNED AND
SEALED
JUL 7 1970

(SEAL)
Attest:

Edward M. Fletcher, Jr.
Attesting Officer

WILLIAM E. SCHUYLER, JR.
Commissioner of Patents